(No Model.) 2 Sheets—Sheet 2.
H. SCHOLFIELD.
APPARATUS FOR DRYING COFFEE, GRAIN, &c.
No. 253,111. Patented Jan. 31, 1882.
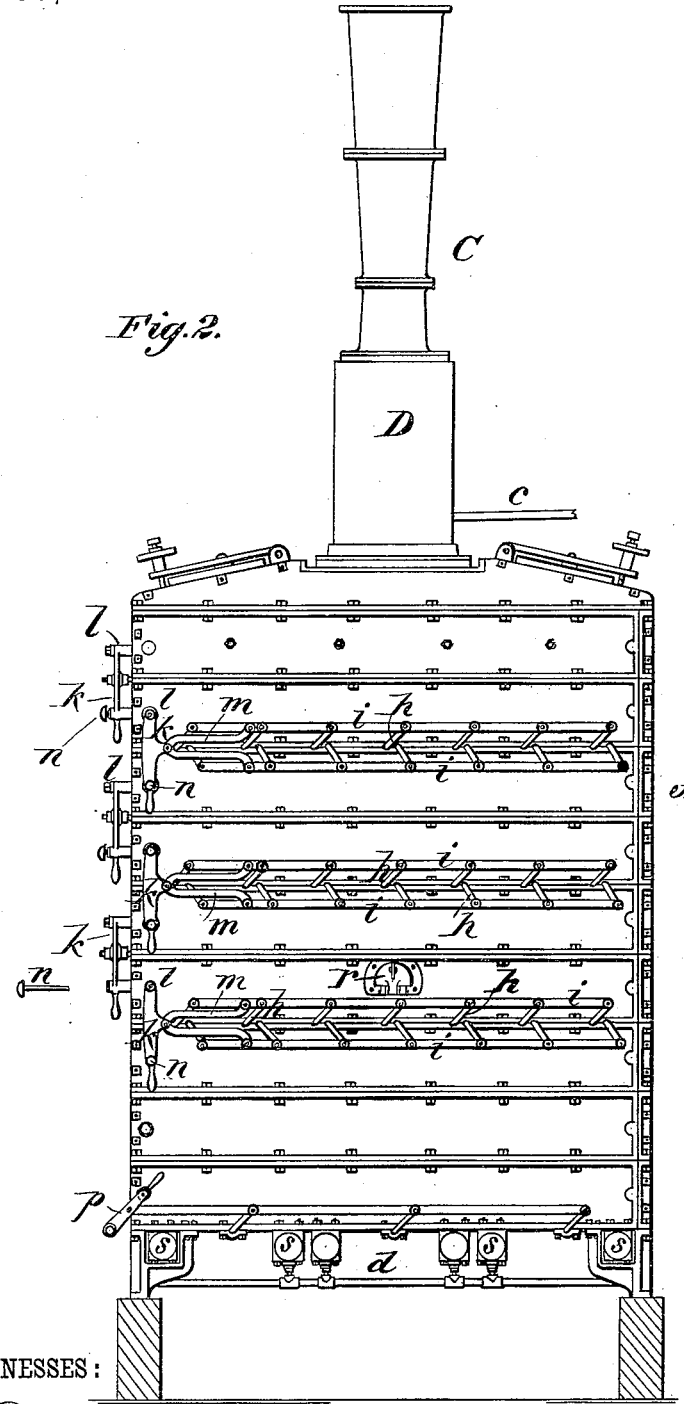

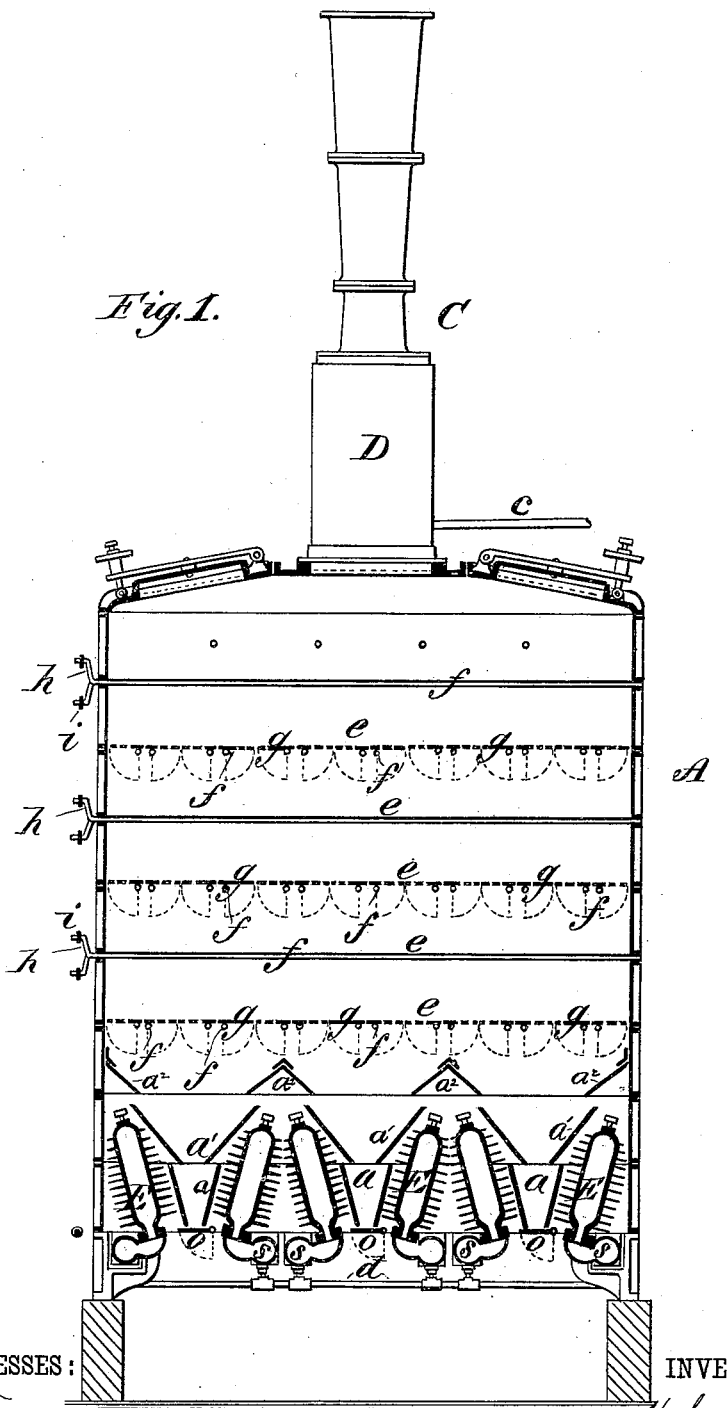

UNITED STATES PATENT OFFICE.

HENRY SCHOLFIELD, OF NEW YORK, N. Y.

APPARATUS FOR DRYING COFFEE, GRAIN, &c.

SPECIFICATION forming part of Letters Patent No. 253,111, dated January 31, 1882.

Application filed August 8, 1881. (No model.)

*To all whom it may concern:*

Be it known that I, HENRY SCHOLFIELD, knight, of Great Britain and Ireland, at present residing in the city, county, and State of New York, have invented certain new and useful Improvements in Apparatus for Drying Coffee, Grain, Fruit, and other Materials, of which the following is a specification.

This invention relates to apparatus for drying or evaporating the moisture from various materials—such as green coffee, grain, &c.— by heated air.

The object of the improvements is to obtain rapidity of action and efficiency of operation, so that the material shall be properly dried at small expense and without risk of damage by excessive heat. Further, the object is to furnish an apparatus that can be operated by unskilled workmen.

I make use of a drying-chamber with a closed top, from which rises an escape-flue or chimney containing an aspirator. Below the chamber are steam-heaters, and the chamber is provided with a series of perforated floors jointed in sections, so as to be turned for discharge of the material from the upper to the lower floors in succession as the drying proceeds.

In the accompanying drawings, Figure 1 is a vertical section of a drying apparatus containing my improvements; and Fig. 2 is a side elevation of the same, showing the connecting-pipes *s* in section.

Similar letters of reference indicate corresponding parts.

A is the drying-chamber, elevated on suitable supports sufficiently to give room beneath for discharge of the dried material. This chamber is preferably constructed of cast-iron, and is provided at the top with an escape-flue or chimney, C, containing an aspirator, D. In the lower part of chamber A are steam-radiators E, which may be of any suitable construction, and are each surrounded by inclined plates $a\, a'\, a^2$, of metal, which direct the air into contact with the radiators and form chutes between the radiators for the discharge of the material. The radiators E connect by pipes *s* to a suitable steam-generator, to which, also, the aspirator is connected by a pipe, *c*, and pipes *d* from the radiators carry off the water of condensation. The chamber A is of rectangular form, and is divided horizontally by floors *e*, constructed as next described.

*f f* are rods sustained in the side plates of the chamber and carrying flaps *g*, of perforated material, which compose the floors. Outside the chamber there are crank-arms *h* on the ends of rods *f*, and on the arms *h* are pivoted the bars *i*.

*k* are hand-levers hung on studs *l* and connected by yokes *m* with bars *i*. By an endwise movement of bars *i* the rods *f* are given a quarter-turn, and the flaps *g* are turned from the horizontal position to the vertical position shown in dotted lines, or vice versa. The levers and bars *i* are held in place, when the flaps are raised, by pins *n*, that are inserted through the levers into recessed studs on the plates of the chamber. On removal of the pins *n* the weight of material will be sufficient to open the flaps.

At the lower ends of the chutes there are hinged flaps or valves *o*, and a bar fitted for movement by a lever, *p*, is connected to the several hinge-pins of the flaps, so that they may be simultaneously opened and closed. These valves or flaps will be opened only when material is to be discharged, and when closed they prevent inlet of air except by the passages around the radiator.

In the top of chamber A are openings allowing insertion of the material. The covers of those openings are arranged for being closed air-tight.

In the operation of the machine steam is admitted to the aspirator and to the radiators. The aspirator acts to create a vacuum in the upper part of the chamber, and thus induces a current of air from below, and the air being heated by the radiators, a constant current of heated air is maintained. A quantity of material to be dried is placed on the upper floor, *e*, and after being allowed to remain for a short time it is discharged to the second floor by opening the flaps *g*. The flaps are then closed and a fresh supply is placed on the upper floor. After a proper time the first-supplied material is discharged to the third floor and the second lot to the second floor, and so on until all the floors contain the same quantity of material. At *r*, just above the lower floor, is a hand-hole and cover, which allows the material to be inspected to determine the length of time it shall remain on the lower floor. In practice, however, the heat being uniform, inspection will not be necessary once the rate of drying is established. When the coffee or other material on the lower floor has remained a sufficient length of time, flaps o are to be opened and the material discharged from the lower floor. By these successive operations the material is dried gradually, and the quantity on each floor is not of sufficient bulk to prevent free passage of the heated air. The drying operation is thus placed under perfect control, and there is no risk of discoloring the material.

By use of the floors, as described, I am enabled to withdraw from the apparatus the material when sufficiently dry without interference with the partially-dried material.

In Letters Patent granted to me March 8, 1881, an aspirator and steam-coil are shown in combination with a drying-chamber. The present invention is an improvement on the apparatus there shown.

Having thus fully described my invention, I claim as new and desire to secure by Letters Patent—

1. In a coffee-drier, the combination of flaps $g$, rods $f$, crank-arms $h$, pivoted bars $i$, hand-levers $k$, and yokes $m$, substantially as and for the purposes described.

2. The combination, with the discharge valves or flaps $o$ and the radiators E, of the plates $a$ $a'$ $a^2$ about and above said radiator, substantially as described, whereby the air is guided in contact with the radiators and the dried coffee is conducted to the discharge-valves, as set forth.

HENRY SCHOLFIELD.

Witnesses:
GEO. D. WALKER,
C. SEDGWICK.